US012612019B2

(12) United States Patent
Takebayashi et al.

(10) Patent No.: US 12,612,019 B2
(45) Date of Patent: Apr. 28, 2026

(54) CONTROL DEVICE TO BE APPLIED TO VEHICLE, AND NON-TRANSITORY COMPUTER-READABLE RECORDING MEDIUM

(71) Applicant: SUBARU CORPORATION, Tokyo (JP)

(72) Inventors: Yosuke Takebayashi, Tokyo (JP); Riku Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 38 days.

(21) Appl. No.: 18/731,955

(22) Filed: Jun. 3, 2024

(65) Prior Publication Data

US 2024/0317196 A1 Sep. 26, 2024

Related U.S. Application Data

(63) Continuation of application No. PCT/JP2022/039786, filed on Oct. 25, 2022.

(51) Int. Cl.
*B60T 8/58* (2006.01)
*B60T 8/171* (2006.01)
*B60T 8/172* (2006.01)

(52) U.S. Cl.
CPC ............... *B60T 8/58* (2013.01); *B60T 8/171* (2013.01); *B60T 8/172* (2013.01); *B60T 2201/022* (2013.01); *B60T 2210/32* (2013.01); *B60T 2250/04* (2013.01)

(58) Field of Classification Search
CPC . B60T 8/58; B60T 8/171; B60T 8/172; B60T 2201/022; B60T 2210/32; B60T 2250/04
See application file for complete search history.

(56) References Cited

U.S. PATENT DOCUMENTS

2021/0141079 A1 5/2021 Ichinose et al.

FOREIGN PATENT DOCUMENTS

| JP | 2014006123 A | * | 1/2014 | .......... G01S 13/931 |
| JP | 2019-219180 A | | 12/2019 | |
| JP | 2020-060893 A | | 4/2020 | |

OTHER PUBLICATIONS

English Machine Translation JP2014006123A (Year: 2014).*
International Search Report received in PCT Application No. PCT/JP2022/039786 dated Jan. 17, 2023, w/ English Translation.

* cited by examiner

*Primary Examiner* — Andrew J Cromer
(74) *Attorney, Agent, or Firm* — Rimon P.C.

(57) ABSTRACT

A control device to be applied to a vehicle includes one or more processors and one or more memories. The one or more processors acquire detection values by respective sensors. The sensors detect the same detection target including a distance to a target, a speed of the vehicle, or both. The one or more processors determine whether or not the detection values by the sensors differ by a predetermined threshold value or more. The one or more processors determine a reference value based on the detection values by the sensors, by a determination method set in accordance with a control using data regarding the detection target, when the detection values by the sensors differ by the predetermined threshold value or more. The one or more processors carry out the control based on the reference value.

3 Claims, 8 Drawing Sheets

CONTROL DEVICE TO BE APPLIED TO VEHICLE, AND NON-TRANSITORY COMPUTER-READABLE RECORDING MEDIUM

CROSS-REFERENCE TO RELATED APPLICATIONS

This application is continuation of International Application No. PCT/JP2022/039786, filed on Oct. 25, 2022, the entire contents of which are hereby incorporated by reference.

BACKGROUND

The disclosure relates to a control device to be applied to a vehicle, and a non-transitory computer-readable recording medium.

Vehicles carry out various controls by using data detected by sensors. Sensors mounted on a vehicle may possibly differ in accuracy of detection values depending on, for example, kinds of the sensors and detection targets. A decline in detection accuracy of the sensors affects reliability of the controls to be carried out by using the data detected by the sensors. For this reason, proposals have been made for techniques of providing the detection of predetermined detection targets with redundancy. For example, Japanese Unexamined Patent Application Publication (JP-A) No. 2019-219180 describes a technique related to a ranging technique. This technique includes: comparing distances to the same object detected by a first detector and a second detector to calculate an amount of error; calculating an amount of correction based on the amount of error; and correcting the distance to the object detected by the second detector based on the amount of correction.

SUMMARY

An aspect of the disclosure provides a control device to be applied to a vehicle. The control device is configured to control the vehicle based on detection values by sensors. The control device includes: one or more processors; and one or more memories communicatably coupled to the one or more processors. The one or more processors are configured to acquire the detection values by the respective sensors. The sensors are configured to detect the same detection target. The same detection target includes a distance to a target, a speed of the vehicle, or both. The one or more processors are configured to determine whether or not the detection values by the sensors differ by a predetermined threshold value or more. The one or more processors are configured to determine a reference value based on the detection values by the sensors, by a determination method set in accordance with to a control using data regarding the detection target, when the detection values by the sensors differ by the predetermined threshold value or more. The one or more processors are configured to carry out the control based on the reference value.

An aspect of the disclosure provides a non-transitory computer-readable recording medium containing a program. The program causes, when executed by one or more processors, the one or more processors to implement a method including: acquiring detection values by respective sensors, in which the sensors are configured to detect the same detection target, and the same detection target includes a distance to a target, a speed of the vehicle, or both; determining whether or not the detection values by the sensors differ by a predetermined threshold value or more; determining a reference value based on the detection values by the sensors, by a determination method set in accordance with a control of the vehicle using data regarding the detection target, when the detection values by the sensors differ by the predetermined threshold value or more; and carrying out the control based on the reference value.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
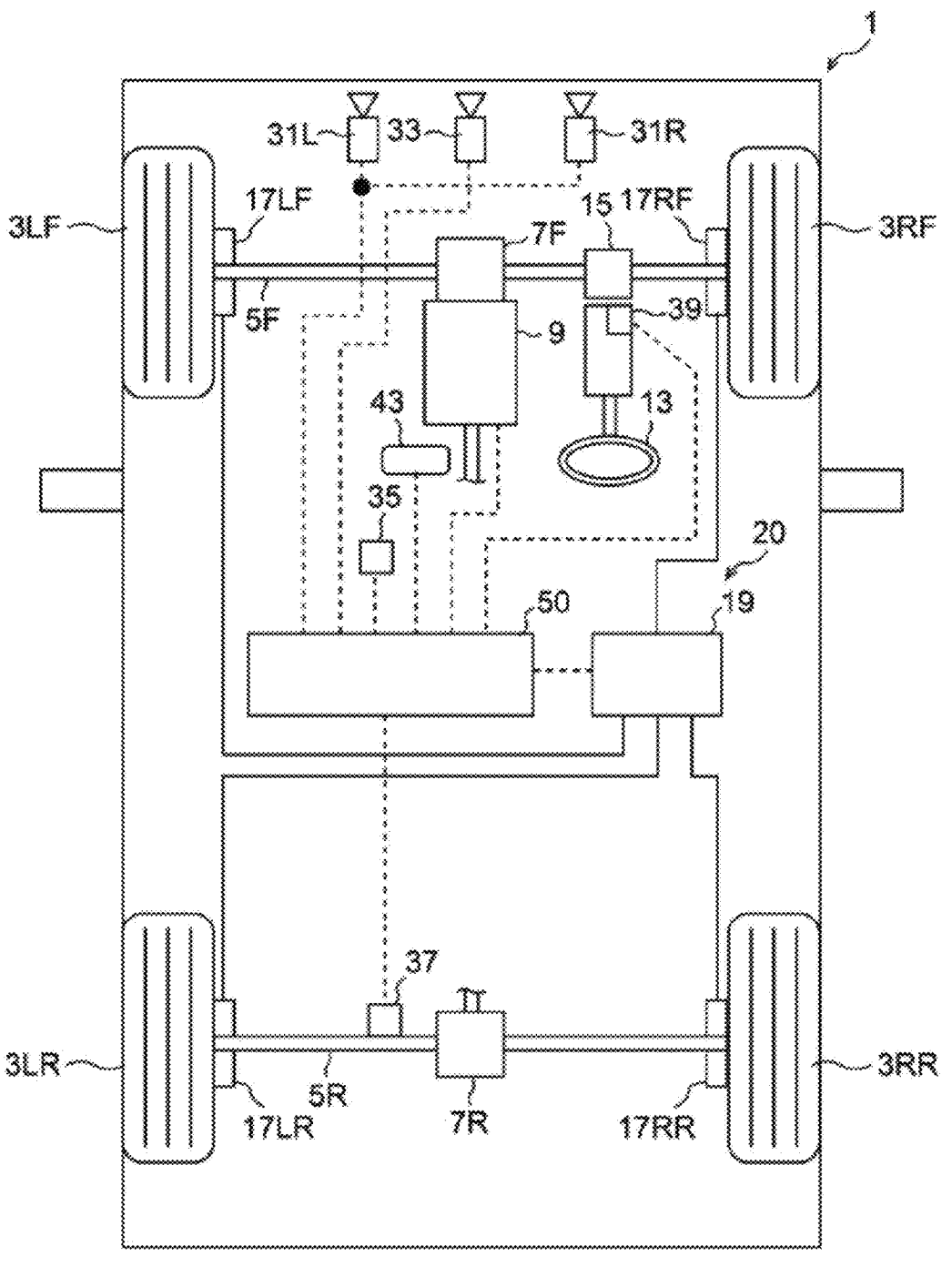
FIG. 1 is a schematic diagram of a configuration example of a vehicle including a control device to be applied to a vehicle according to an embodiment of the disclosure.

In the technique described in JP-A No. 2019-219180, the method of correcting the detected distance is limited to one pattern. Depending on the control to be carried out by using the detection value, there is possibility that the correction method is not an appropriate correction method. For example, when data regarding a distance to a detected object is used in an automatic emergency brake control, it is advantageous in terms of safety to use data regarding a greater distance. In contrast, when data regarding a distance to a detected preceding vehicle is used in an adaptive cruise control that includes allowing the vehicle to follow the preceding vehicle with a predetermined inter-vehicle distance, using data regarding a smaller distance may possibly give the sense of anxiety to an occupant. Meanwhile, using data regarding a greater distance may give the sense of discomfort to the occupant.

The forgoing is not limited to the ranging techniques including detecting a distance to an object. In providing the detection of each detection target with redundancy, limiting, to one pattern, the method of correcting the detection values by sensors that detect the same detection target may cause possibility of inappropriate correction for the control to be carried out by using the detection value.

It is desirable to provide a control device to be applied to a vehicle and a non-transitory recording medium that make it possible to determine an appropriate reference value and carry out a control appropriately when there is a great deviation between detection values by sensors that detect the same detection target.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

In the disclosure, a "detection target" is a state value indicated by a detection value by a sensor, or a state value derived from the detection value by calculation. Non-limiting examples of the "detection target" may include a distance from a vehicle to a material or immaterial object and a speed of the vehicle. It is to be noted that the "detection target" is a state value detectable by a sensor or calculatable. The "detection target" is not limited to a distance and a speed of the vehicle, i.e., a vehicle speed. It suffices that the "detection target" is any state value to be used in the control.

Moreover, in the disclosure, the "control" is a control to be carried out by one or more processors to make a predetermined control of the vehicle. Non-limiting examples of the "control" may include an adaptive cruise control, a constant speed control, and an emergency brake control or a collision avoidance control. The adaptive cruise control includes allowing a vehicle to follow a preceding vehicle while keeping a predetermined inter-vehicle distance. The constant speed control includes allowing a vehicle to travel at a predetermined set vehicle speed. The emergency brake control or the collision avoidance control includes avoiding collision with an obstacle or a random vehicle. It is to be noted that the "control" is not limited to the examples mentioned above but it suffices that the "control" is any control to be carried out by one or more processors by using the data regarding the "detection target" detected by the sensors.

<1. Overall Configuration of Vehicle>

Description is given first of an example of an overall configuration of a vehicle including a control device to be applied to a vehicle according to an embodiment of the disclosure.

FIG. 1 is a schematic diagram illustrating a configuration example of a vehicle including a control device to be applied to a vehicle.

A vehicle 1 is constituted as a four-wheel drive vehicle that transmits driving torque to a right front wheel 3RF, a left front wheel 3LF, a right rear wheel 3RR, and a left rear wheel 3LR (in the following, collectively referred to as "wheels 3" unless distinction is particularly necessary). The driving torque is outputted from a driving force source 9 that generates the driving torque for the vehicle. The driving force source 9 may be an internal combustion engine such as a gasoline engine or a diesel engine, or may be a driving motor. The vehicle 1 may be a hybrid electric vehicle including an internal combustion engine and a driving motor together, as the driving force source 9.

It is to be noted that the vehicle 1 may be an electric vehicle including two driving motors, e.g., a front wheel driving motor and a rear wheel driving motor, or may be an electric vehicle including driving motors that correspond to the respective wheels 3. Moreover, when the vehicle 1 is an electric vehicle or a hybrid electric vehicle, a secondary battery, and a generator such as a motor and a fuel cell are mounted on the vehicle 1. The secondary battery accumulates electric power to be supplied to the driving motor. The generator generates electric power to be charged in the battery.

The vehicle 1 includes the driving force source 9, an electric steering device 15, and a brake system 20, as devices to be used in a driving control of the vehicle 1. The driving force source 9 outputs the driving torque to be transmitted to a front wheel driving shaft 5F and a rear wheel driving shaft 5R through an unillustrated transmission, a front wheel differential mechanism 7F, and a rear wheel differential mechanism 7R. Driving of the driving force source 9 and the transmission is controlled by a control device 50 including one or more electronic control units (ECU: Electronic Control Unit).

The electric steering device 15 is provided on the front wheel driving shaft 5F. The electric steering device 15 includes an unillustrated electric motor and an unillustrated gear mechanism. The electric steering device 15 is controlled by the control device 50 to adjust steering angles of the right front wheel 3RF and the left front wheel 3LF. In manual driving, the control device 50 controls the electric steering device 15 based on a steering wheel angle of a steering wheel 13 by a driver who drives the vehicle 1. Moreover, while performing automated driving, the control device 50 controls the electric steering device 15 based on a target steering angle to be set.

The brake system 20 includes brake devices 17RF, 17LF, 17RR, and 17LR (hereinafter, collectively referred to as "brake devices 17" unless distinction is particularly necessary), and a hydraulic control unit 19. Each of the brake devices 17 includes a device in which, for example, a brake disc that rotates with the wheel is placed between brake pads by utilizing hydraulic pressure to apply a braking force to the wheels 3. The hydraulic control unit 19 may include an electric motor pump, multiple solenoid valves, and a brake control device. The electric motor pump may discharge brake fluid. The solenoid valves may adjust the hydraulic pressure to be supplied to the respective brake devices 17. The brake control device may control driving of the electric motor pump and the solenoid valves. The brake system 20 may control the hydraulic pressure to be supplied to each of the brake devices 17 to generate the predetermined braking force in each of the wheels 3. When the vehicle 1 is an electric vehicle or a hybrid electric vehicle, the brake system 20 is used in conjunction with a regenerative brake by the driving motor.

The control device 50 may include one or more electronic control devices that control driving of the driving force source 9, the electric steering device 15, and the brake system 20. The driving force source 9 outputs the driving torque for the vehicle 1. The electric steering device 15 controls the steering wheel angle of the steering wheel 13 or a steering angle of steering wheels. The brake system 20 controls the braking force of the vehicle 1. The control device 50 may control the driving of the transmission that performs shifting of an output outputted from the driving force source 9 and transmits the resultant output to the wheels 3. The control device 50 is configured to carry out one or more controls using data regarding a detection target by various sensors.

The vehicle 1 may further include stereo cameras 31R and 31L, LiDAR (Light Detection And Ranging) 33, a vehicle position sensor 35, a wheel speed sensor 37, and a steering angle sensor 39.

The stereo cameras 31R and 31L may capture a forward view of the vehicle 1 on predetermined sampling cycles and generate image data. The stereo cameras 31R and 31L may include imaging elements such as CCD (Charged-Couped Devices) or CMOS (Complementary Metal-Oxide-Semiconductor, and transmit the generated stereo image data to the control device 50. The vehicle 1 may include monocular cameras instead of the stereo camera.

The LiDAR 33 may send out optical waves on predetermined sampling cycles and receive reflected waves of the optical waves, and generate distribution data regarding points of reflection, i.e., points of measurement. The LiDAR 33 may transmit the generated distribution data regarding the points of reflection to the control device 50.

It is to be noted that the vehicle 1 may include an obstacle detection sensor or a ranging sensor in addition to the stereo cameras 31R and 31L, and the LiDAR 33. The obstacle detection sensor or the ranging sensor may be exemplified by a radar sensor such as millimeter wave radar, or an ultrasonic sensor.

The vehicle position sensor 35 may detect a position of the vehicle 1 on map data. The vehicle position sensor 35 may include a GNSS (Global Navigation Satellite System) sensor, and receive satellite signals from positioning satellites. The GNSS sensor is exemplified by a GPS (Global Positioning System) sensor. The GNSS sensor may transmit data regarding latitude and longitude included in the received satellite signals, to the control device 50. It is to be noted that the vehicle position sensor 35 is not limited to a GPS sensor but may include a sensor or an antenna that receives satellite signals from a satellite system that identifies the position of the vehicle 1.

The wheel speed sensor 37 may detect a rotation speed of the rear wheel driving shaft 5R. In the following, the rotation speed is referred to as a "wheel speed". The wheel speed sensor 37 may transmit data regarding the wheel speed to the control device 50. The data regarding the wheel speed may be used in calculation of the speed of the vehicle 1. In the following, the speed of the vehicle 1 is referred to as a "vehicle speed". It is to be noted that the wheel speed sensor 37 may detect a rotation speed of the front wheel driving shaft 5F.

The steering angle sensor 39 may detect the steering wheel angle of the steering wheel 13 or the steering angle of the steering wheels, and transmit data regarding the steering wheel angle or the steering angle to the control device 50.

<2. Control Device to be Applied to Vehicle>

Next, a control device to be applied to a vehicle according to this embodiment is described in detail.

(2-1. Configuration Example)

Figure 2:
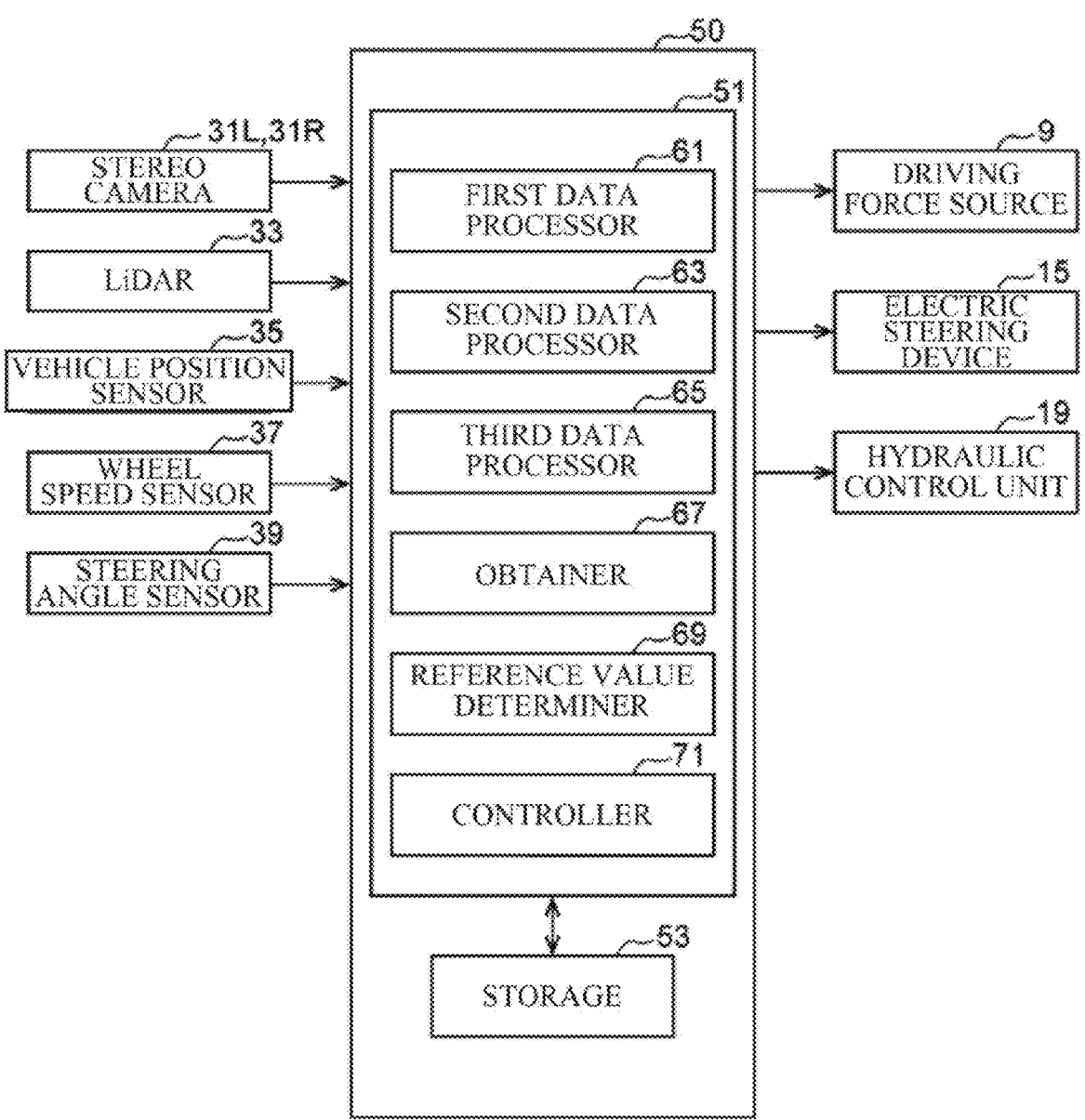
FIG. 2 is a block diagram of a configuration example of the control device to be applied to the vehicle according to the embodiment.

FIG. 2 is a block diagram illustrating a configuration example of a control system of the vehicle including the control device 50 to be applied to the vehicle according to this embodiment.

The control device 50 may serve as a device that carries out various controls to control driving of the vehicle 1 by allowing one or more processors such as one or more CPUs (Central Processing Unit) to execute a computer program. The computer program is a computer program that causes the processors to perform operation described later to be performed by the control device 50. The computer program to be executed by the processors may be contained in a recording medium serving as a storage 53 (memory) provided in the control device 50. Alternatively, the computer program to be executed by the processors may be contained in a recording medium built in the control device 50, or any recording medium externally attachable to the control device 50.

The recording medium containing the computer program may be: a magnetic medium such as a hard disk, a floppy disk, and a magnetic tape; an optical recording medium such as a CD-ROM (Compact Disk Read Only Memory), a DVD (Digital Versatile Disk), and a Blu-ray (registered trademark); a magnetic-optical medium such as a floptical disk; a memory such as a RAM (Random Access Memory) and a ROM (Read Only Memory); and a flash memory such as a USB (Universal Serial Bus) memory and an SSD (Solid State Drive); or any other medium configured to hold programs.

To the control device 50, the stereo cameras 31R and 31L, the LiDAR 33, the vehicle position sensor 35, the wheel speed sensor 37, and the steering angle sensor 39 may be coupled through a dedicated line, or a communication bus of, for example, the CAN (Controller Area Network) or the LIN (Local Inter Net). Moreover, to the control device 50, the driving force source 9, the electric steering device 15, and the hydraulic control unit 19 may be coupled.

It is to be noted that in FIG. 2, the control device 50 is illustrated as a single device, but the control device 50 may include multiple devices communicatably coupled together. The control device 50 is not limited to an electronic control device mounted on the vehicle 1, but may be a terminal device such as a smartphone or a wearable device. Alternatively, the control device 50 may be an external server configured to communicate with each device provided in the vehicle 1 through a mobile communication system.

The control device 50 may include a processor 51 and the storage 53. The processor 51 may include one or more processors such as a CPU (Central Processing Unit) and various peripheral parts. A portion or all of the processor 51 may include an updatable one such as firmware, or may be, for example, a program module to be executed in accordance with a command from, for example, a CPU.

The storage 53 may include a memory such as a RAM or a ROM. However, there is no particular limitation on the number of the storages 53 and the kind of the storage 53. The storage 53 may hold a computer program to be executed by the processor 51, and data to be used in calculation processing, e.g., various parameters, detection data, and calculation results.

(2-2. Configuration)

Description is given next of a configuration of the processor 51 of the control device 50. The processor 51 may include a first data processor 61, a second data processor 63, a third data processor 65, an obtainer 67, a reference value determiner 69, and a controller 71. These may be provided by one or more processors such as a CPU executing a computer program. However, a portion or all of the first data processor 61, the second data processor 63, the third data processor 65, the obtainer 67, the reference value determiner 69, and the controller 71 may include analog circuitry.

(2-2-1. First Data Processor)

The first data processor 61 may carry out processing of detecting surrounding environment of the vehicle 1 based on the image data transmitted from the stereo cameras 31R and 31L on the predetermined sampling cycles. In one example, the first data processor 61 may perform image processing on the image data transmitted from the stereo cameras 31R and 31L to detect random vehicles, bicycles, buildings, persons, and other objects present around the vehicle 1 using object detection technology. Moreover, the first data processor 61 may calculate positions of the random vehicles, etc. and distances from the vehicle 1 to the random vehicles, etc. Furthermore, the first data processor 61 may estimate speeds of the random vehicles, etc. based on changes in the positions of the random vehicles, etc. and the distances from the vehicle 1 to the random vehicles, etc. In addition, the first data processor 61 may detect a borderline of a road or a roadway based on the image data.

(2-2-2. Second Data Processor)

The second data processor 63 may carry out processing of detecting the surrounding environment of the vehicle 1 based on the distribution data regarding the points of reflection transmitted from the LiDAR 33 on the predetermined sampling cycles. In one example, the second data processor 63 may detect an object present around the vehicle 1 based on the distribution data transmitted from the LiDAR 33. Moreover, the second data processor 63 may calculate, based on the time-series distribution data, a position of the detected object, a distance from the vehicle 1 to the object, and a relative speed of the object with respect to the vehicle 1. Furthermore, the second data processor 63 may detect the borderline of the road or the roadway based on the distribution data.

(2-2-3. Third Data Processor)

The third data processor 65 may carry out processing of detecting the speed of the vehicle 1 based on position data regarding the vehicle 1 transmitted from the vehicle position sensor 35 on the predetermined sampling cycles. In one example, the third data processor 65 may calculate a distance of movement for each predetermined sampling cycle based on the latitude and the longitude transmitted from the vehicle position sensor 35, and estimate the speed of the vehicle 1 by dividing the distance of movement by the time of the cycle.

(2-2-4. Obtainer)

The obtainer 67 carries out an acquisition process of acquiring detection values of a detection target by various sensors provided in the vehicle 1. In one example, the obtainer 67 may acquire the detection value detected by the first data processor 61 based on the image data by the stereo cameras 31R and 31L. The detection target of the stereo cameras 31R and 31L may include, for example, a distance to an object and a speed of the object. Moreover, the obtainer 67 may acquire the detection value detected by the second data processor 63 based on the distribution data from the LiDAR 33. The detection target of the LiDAR 33 may include, for example, the distance to the object and the speed of the object. Furthermore, the obtainer 67 may acquire the detection value detected by the third data processor 65 based on the position data regarding the vehicle 1 from the vehicle position sensor 35. The detection target of the vehicle position sensor 35 may include the speed of the vehicle 1. In addition, the obtainer 67 may acquire the detection value detected based on a signal from the wheel speed sensor 37. The detection target of the wheel speed sensor 37 may include the speed of the vehicle 1.

(2-2-5. Reference Value Determiner)

The reference value determiner 69 carries out a reference value determination process of determining a reference value by a determination method set in accordance with a control using data regarding the detection target. In one example, the reference value determiner 69 may carry out a determination process of determining whether or not the detection values by the sensors differ by a predetermined standard threshold value or more. When the detection values by the sensors differ by the predetermined standard threshold value or more, the reference value determiner 69 determines the reference value by the determination method set in accordance with the control using the data regarding the detection target. That is, when the detection values by the sensors differ by the predetermined standard threshold value or more, and it is estimated that any one of the sensors has declined in accuracy or has a failure, the reference value determiner 69 determines the reference value that makes it possible to carry out the control while ensuring safety or alleviating the sense of discomfort to be given to the occupant.

In this embodiment, the reference value determiner 69 may determine the reference value by the determination method set for each of the following cases: a case where the control is related to travel safety of the vehicle 1; a case where the control serves to control a predetermined state value to a target value; and a case where the control is related to compliance with a limit by a traffic rule.

When the control is related to the travel safety of the vehicle 1, the reference value determiner 69 may determine the reference value to be used for the control, by a first reference value determination method. When the control is related to the travel safety of the vehicle 1, the reference value to be used for the control may be determined to keep the vehicle 1 safety-wise. In other words, in the first reference value determination method, the reference value determiner 69 may determine, as the reference value, whichever of the detection values by the sensors has a relatively higher degree of risk. Thus, by the control, a control to lower the degree of risk of the vehicle 1 is carried out. Hence, it is possible to suppress a decline in the travel safety even when any one of the sensors has an abnormality.

Non-limiting examples of the control related to the travel safety of the vehicle 1 may include the emergency brake control. The emergency brake control includes automatically generating the braking force of the vehicle 1, when an obstacle or a random vehicle is detected within a predetermined distance in a direction of travel of the vehicle 1, or when estimated time until the vehicle 1 collides with the detected obstacle or the detected random vehicle becomes shorter than predetermined time. Hereinafter, the estimated time is also referred to as "collision margin time". When the control is the emergency brake control, data regarding, for example, a distance to the obstacle or the random vehicle and the speed of the vehicle 1 may be used as the detection target of the sensors. In this embodiment, the distance may be detected based on measurement data by the stereo cameras 31R and 31L, and the LiDAR 33. The speed of the vehicle 1 may be detected based on measurement data by the vehicle position sensor 35 and the wheel speed sensor 37.

The reference value determiner 69 may determine, by the first reference value determination method, whichever of the distances and whichever of the vehicle speeds minimize the collision margin time, as the respective reference values. In one example, the reference value determiner 69 may determine, as the reference value, whichever distance is shorter out of the distances detected based on the measurement data by the stereo cameras 31R and 31L, and the LiDAR 33. Moreover, the reference value determiner 69 may determine, as the reference value, whichever vehicle speed is higher out of the vehicle speeds detected based on the measurement data by the vehicle position sensor 35 and the wheel speed sensor 37. This makes it possible to adopt the detection value that advances starting time of braking operation by the emergency brake control the most, leading to suppression of the decline in the travel safety of the vehicle 1.

When the control serves to control the predetermined state value to the target value, the reference value determiner 69 may determine the reference value to be used for the control, by a second reference value determination method. When the control serves to control the predetermined state value to the target value, the reference value to be used for the control may be determined to prevent a deviation between a control target and the target value from becoming too large. That is, in the second reference value determination method, the reference value determiner 69 may determine, as the reference value, an average value of the detection values by the sensors. Thus, in a state where it is unknown which detection value is correct, it is possible to suppress an actual state value from deviating significantly from the target value, by controlling, with the control, an inaccurate detection value to the target value.

Non-limiting examples of the control serving to control the predetermined state value to the target value may include the adaptive cruise control. The adaptive cruise control includes controlling an inter-vehicle distance from the vehicle 1 to a preceding vehicle to a predetermined target value set in accordance with the vehicle speed. When the control is the adaptive cruise control, for example, data regarding the distance to the preceding vehicle, i.e., the inter-vehicle distance, and the speed of the vehicle 1 may be used as the detection target by the sensors. In this embodiment, the inter-vehicle distance may be detected based on the measurement data by the stereo cameras 31R and 31L, and the LiDAR 33. The speed of the vehicle 1 may be detected based on the measurement data by the vehicle position sensor 35 and the wheel speed sensor 37.

The reference value determiner 69 may determine, as the reference value, an average value of the inter-vehicle distances or an average value of the vehicle speeds detected by the respective sensors, by the second reference value determination method. In one example, the reference value determiner 69 may determine, as the reference value, the average value of the inter-vehicle distances detected based on the measurement data by the stereo cameras 31R and 31L, and the LiDAR 33. Moreover, the reference value determiner 69 may determine, as the reference value, the average value of the vehicle speeds detected based on the measurement data by the vehicle position sensor 35 and the wheel speed sensor 37. Thus, it is possible to suppress an actual inter-vehicle distance as the control target of the adaptive cruise control from deviating significantly from a target inter-vehicle distance set in accordance with the vehicle speed.

Non-limiting examples of the control serving to control the predetermined state value to the target value may include the constant speed control. The constant speed control includes controlling the speed of the vehicle 1 to a predetermined target value. When the control is the constant speed control, data regarding the speed of the vehicle 1 may be used as the detection target by the sensors. In this embodiment, the speed of the vehicle 1 may be detected based on the measurement data by the vehicle position sensor 35 and the wheel speed sensor 37. The reference value determiner 69 may determine, as the reference value, the average value of the vehicle speeds detected based on the measurement data by the vehicle position sensor 35 and the wheel speed sensor 37, by the second reference value determination method. Thus, it is possible to suppress the actual vehicle speed as the control target of the constant speed control from deviating significantly from a target vehicle speed.

Non-limiting examples of the control serving to control the predetermined state value to the target value may include travel position keeping, i.e., a lane keeping control. The travel position keeping includes controlling a lateral position of travel of the vehicle to a predetermined target value. When the control is the travel position keeping, for example, a distance from the vehicle 1 to the borderline of the roadway or the road may be used as the detection target by the sensors. In this embodiment, the distance may be detected based on the measurement data by the stereo cameras 31R and 31L, and the LiDAR 33. The reference value determiner 69 may determine, as the reference value, an average value of the distances detected based on the measurement data by the stereo cameras 31R and 31L, and the LiDAR 33, by the second reference value determination method. Thus, it is possible to suppress the actual position of travel as the control target of the travel position keeping from deviating significantly from the target position.

When the control is related to the compliance with the limit by the traffic rule, the reference value determiner 69 may determine the reference value to be used for the control by a third reference value determination method. When the control is related to the compliance with the limit by the traffic rule, the reference value to be used for the control may be determined to keep a target of the limit by the traffic rule from being in excess of the relevant limit and bring the target of the limit by the traffic rule closer to the limit. That is, in the third reference value determination method, when one or more detection values out of the detection values by the sensors are in excess of the limit by the traffic rule, the reference value determiner 69 may determine, as the reference value, whichever detection value has the greatest excess, out of the one or more detection values in excess of the limit by the traffic rule. When the detection values by the sensors are devoid of excess of the limit by the traffic rule, the reference value determiner 69 may determine, as the reference value, whichever detection value is closest to the limit by the traffic rule, out of the detection values by the sensors. Thus, in the state where it is unknown which detection value is correct, it is possible to prevent the control from causing the state value as the control target to be in excess of the limit by the traffic rule or deviate significantly from the limit.

Non-limiting examples of the control related to the compliance with the limit by the traffic rule may include keeping the speed of the vehicle 1 to or below a speed limit or a legal speed. In the following, the speed limit or the legal speed are collectively referred to as the "speed limit and the like". Keeping the speed of the vehicle 1 to or below the speed limit and the like is also referred to as "speed limit keeping". When the control serves to keep the vehicle speed to or below the speed limit and the like, data regarding the speed of the vehicle 1 may be used as the detection target by the sensors. In this embodiment, the speed of the vehicle 1 may be detected based on the measurement data by the vehicle position sensor 35 and the wheel speed sensor 37. When one or both of the vehicle speed detected based on the measurement data by the vehicle position sensor 35 and the vehicle speed detected based on the measurement data by the wheel speed sensor 37 are in excess of the speed limit and the like, the reference value determiner 69 may determine, as the reference value, whichever vehicle speed has the greatest excess, out of the vehicle speeds in excess of the speed limit and the like, by the third reference value determination method. Thus, deceleration operation is performed to keep whichever vehicle speed has the greatest excess out of the vehicle speeds detected by the sensors within the speed limit, making it possible to surely keep the vehicle speed to or below the speed limit.

When the vehicle speed detected based on the measurement data by the vehicle position sensor 35 and the vehicle speed detected based on the measurement data by the wheel speed sensor 37 are devoid of excess of the speed limit, the reference value determiner 69 may determine, as the reference value, whichever vehicle speed is closer to the speed limit. Thus, it is possible to surely keep the actual vehicle speed to or below the speed limit.

Here, with reference to FIGS. 3 to 10, description is given of a difference between the reference values to be determined by the reference value determiner 69. In the following, an example is described in which the reference value determiner 69 determines the reference value in consideration of an accuracy error of the detection result set for each sensor.

Figure 3:
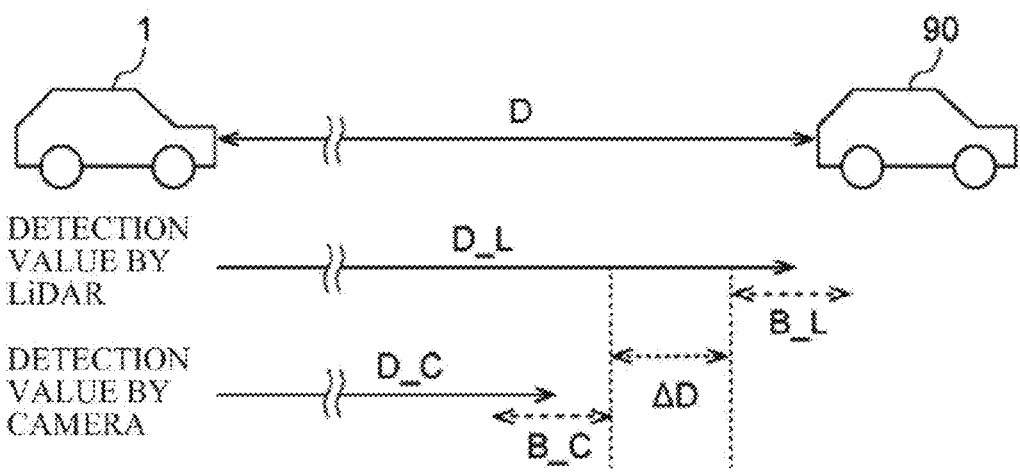
FIG. 3 is a diagram of an example of a difference in detection values of an inter-vehicle distance from the vehicle to a preceding vehicle.
Figure 4:
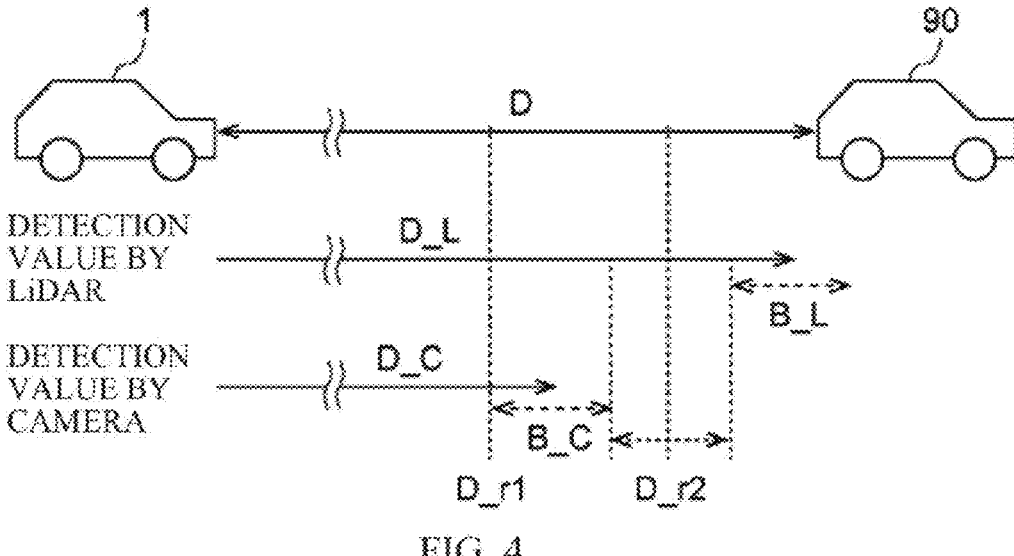
FIG. 4 is a diagram of a reference value of the inter-vehicle distance from the vehicle to the preceding vehicle in the embodiment.

FIGS. 3 and 4 illustrate a reference value D_r of an inter-vehicle distance from the vehicle 1 to a preceding vehicle 90. As illustrated in FIG. 3, let us assume that, with respect to an actual inter-vehicle distance D, there is a difference ΔD between a detection value D_L by the LiDAR 33 and a detection value D_C by the stereo cameras 31R and 31L. The difference ΔD is equal to or greater than a predetermined standard threshold value even when accuracy errors B_L and B_C are taken into consideration. Although the reference value determiner 69 is able to calculate the difference ΔD, the reference value determiner 69 is not able to determine which of the LiDAR 33 and the stereo cameras 31R and 31L have declined in accuracy.

In this case, as illustrated in FIG. 4, the reference value determiner 69 may adopt, as a reference value D_r1 of the inter-vehicle distance to be used for the emergency braking control, the detection value by the stereo cameras 31R and 31L that minimizes the collision margin time until collision with the preceding vehicle 90. In the example in FIG. 4, the shortest distance in consideration of the accuracy error B_C of the stereo cameras 31R and 31L may be also determined as the reference value D_r1. Meanwhile, the reference value determiner 69 may adopt, as a reference value D_r2 of the inter-vehicle distance to be used for the adaptive cruise control, an average value of the shortest distance in consideration of the accuracy error B_L of the LiDAR 33 and the longest distance in consideration of the accuracy error B_C of the stereo cameras 31R and 31L, to keep deviations from the detection values by both sensors from becoming too large.

Figure 5:
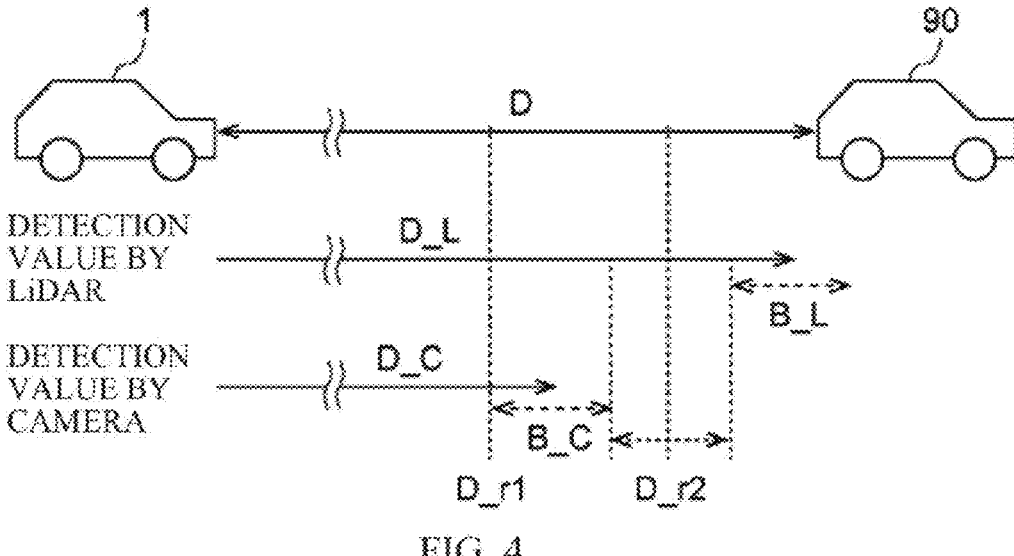
FIG. 5 is a diagram of an example of a difference in detection values of a speed of the vehicle.

FIGS. 5 to 8 illustrate a reference value V_r of the speed of the vehicle 1, i.e., the vehicle speed. As illustrated in FIG. 5, let us assume that there is a difference ΔV between a detection value V_G by the vehicle position sensor 35 and a detection value V_S by the wheel speed sensor 37. The difference ΔV is equal to or greater than a predetermined standard threshold value even when accuracy errors B_G and B_S are taken into consideration. Although the reference value determiner 69 is able to calculate the difference ΔV, the reference value determiner 69 is not able to determine which of the vehicle position sensor 35 and the wheel speed sensor 37 has declined in accuracy.

Figures 6, 7, 8:
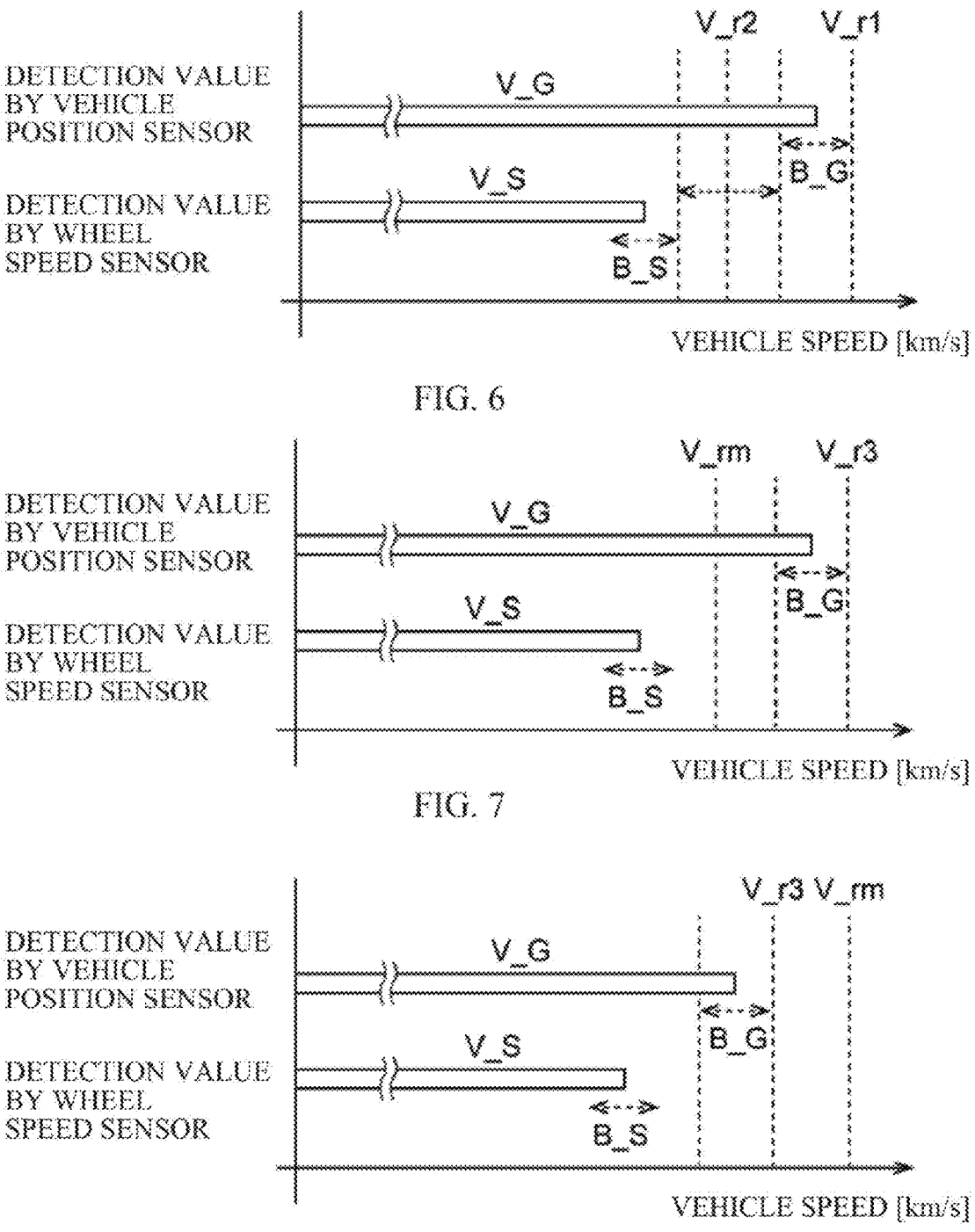
FIG. 6 is a diagram of a reference value of the speed of the vehicle in the embodiment.
FIG. 7 is a diagram of the reference value of the speed of the vehicle in the embodiment.
FIG. 8 is a diagram of the reference value of the speed of the vehicle in the embodiment.

In this case, as illustrated in FIG. 6, the reference value determiner 69 may adopt, as a reference value V_r1 of the vehicle speed to be used for the emergency brake control, the detection value by the vehicle position sensor 35 that minimizes the collision margin time until the collision with the preceding vehicle 90. In the example in FIG. 6, the maximum speed in consideration of the accuracy error B_G of the vehicle position sensor 35 may be also determined as the reference value V_r1. Meanwhile, the reference value determiner 69 may adopt, as a reference value V_r2 of the vehicle speed to be used for the adaptive cruise control or the constant speed control, an average value of the minimum vehicle speed in consideration of the accuracy error B_G of the vehicle position sensor 35 and the maximum vehicle speed in consideration of the accuracy error B_S of the wheel speed sensor 37, to keep deviations from the detection values by both sensors from becoming too large.

Moreover, as illustrated in FIG. 7, when the vehicle speed V_G by the vehicle position sensor 35 is in excess of a speed limit V_rm, the reference value determiner 69 may adopt the detection value by the vehicle position sensor 35, as a reference value V_r3 of a vehicle speed V to be used for the speed limit keeping. In the example in FIG. 7, the maximum speed in consideration of the accuracy error B_G of the vehicle position sensor 35 may be also determined as the reference value V_r3.

Meanwhile, as illustrated in FIG. 8, when both the vehicle speed V_G by the vehicle position sensor 35 and the vehicle speed V_S by the wheel speed sensor 37 are lower than the speed limit V_rm, the reference value determiner 69 may adopt the detection value by the vehicle position sensor 35 closer to the speed limit V_rm, as the reference value V_r3 of the vehicle speed V to be used for the speed limit keeping. In the example in FIG. 8, the maximum speed in consideration of the accuracy error B_G of the vehicle position sensor 35 may be also determined as the reference value V_r3.

Figures 9, 10:
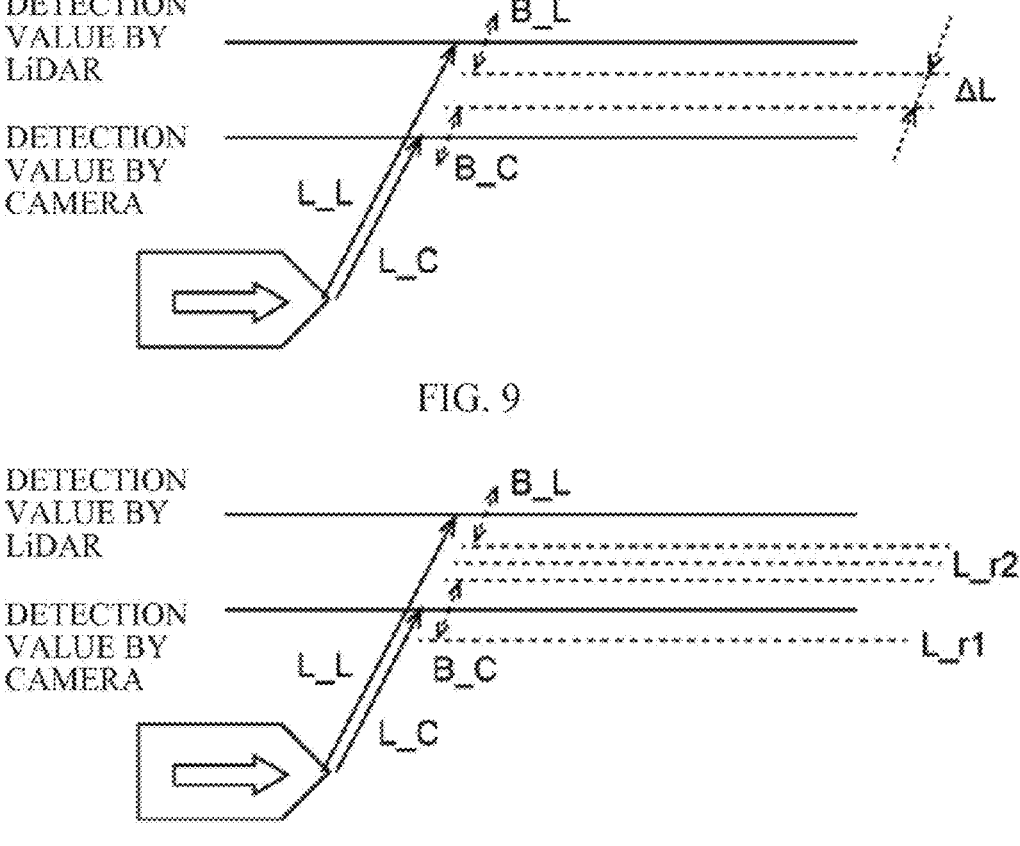
FIG. 9 is a diagram of an example of a difference in detection values of a distance from the vehicle to a curbstone at an edge of a road.
FIG. 10 is a diagram of a reference value of the distance from the vehicle to the curbstone at the edge of the road in the embodiment.

FIGS. 9 and 10 illustrate a reference value L_r of the distance from the vehicle 1 to the curbstone at the edge of the road. As illustrated in FIG. 9, let us assume that there is a difference ΔL between a detection value L_L by the LiDAR 33 and a detection value L_C by the stereo cameras 31R and 31L. The difference ΔL is equal to or greater than a predetermined standard threshold value even when accuracy errors B_L and B_C are taken into consideration. Although the reference value determiner 69 is able to calculate the difference ΔL, the reference value determiner 69 is not able to determine which of the LiDAR 33 and the stereo cameras 31R and 31L have declined in accuracy.

In this case, as illustrated in FIG. 10, the reference value determiner 69 may adopt, as a reference value L_r1 of the distance to be used for the emergency braking control to avoid collision with the curbstone, the detection value by the stereo cameras 31R and 31L that minimizes the collision margin time until collision with the curbstone. In the example in FIG. 10, the minimum distance in consideration of the accuracy error B_C of the stereo cameras 31R and 31L may be also determined as the reference value L_r1. Meanwhile, the reference value determiner 69 may adopt, as a reference value L_r2 of the distance to be used for the travel position keeping, an average value of the minimum distance in consideration of the accuracy error B_L of the LiDAR 33 and the maximum distance in consideration of the accuracy error B_C of the stereo cameras 31R and 31L, to prevent deviations from the detection values by both sensors from becoming too large.

(2-2-6. Controller)

The controller 71 may carry out a control process of carrying out the predetermined control based on the reference value determined by the reference value determiner 69. In this embodiment, the controller 71 may carry out, as the controls, the emergency brake control, the adaptive cruise control, the constant speed control, the travel position keeping, and the speed limit keeping. The controller 71 may set, in accordance with each of the controls, one or more of: the target value of the steering angle or a steering angular velocity; the target value of the acceleration rate; and the target value of the deceleration rate. Thus, the controller 71 may control the driving of the electric steering device 15, the driving force source 9, and the hydraulic control unit 19.

(2-3. Operation Example)

Description is given next of an example of processing operation by the control device 50 to be applied to the vehicle according to this embodiment.

Figure 11:
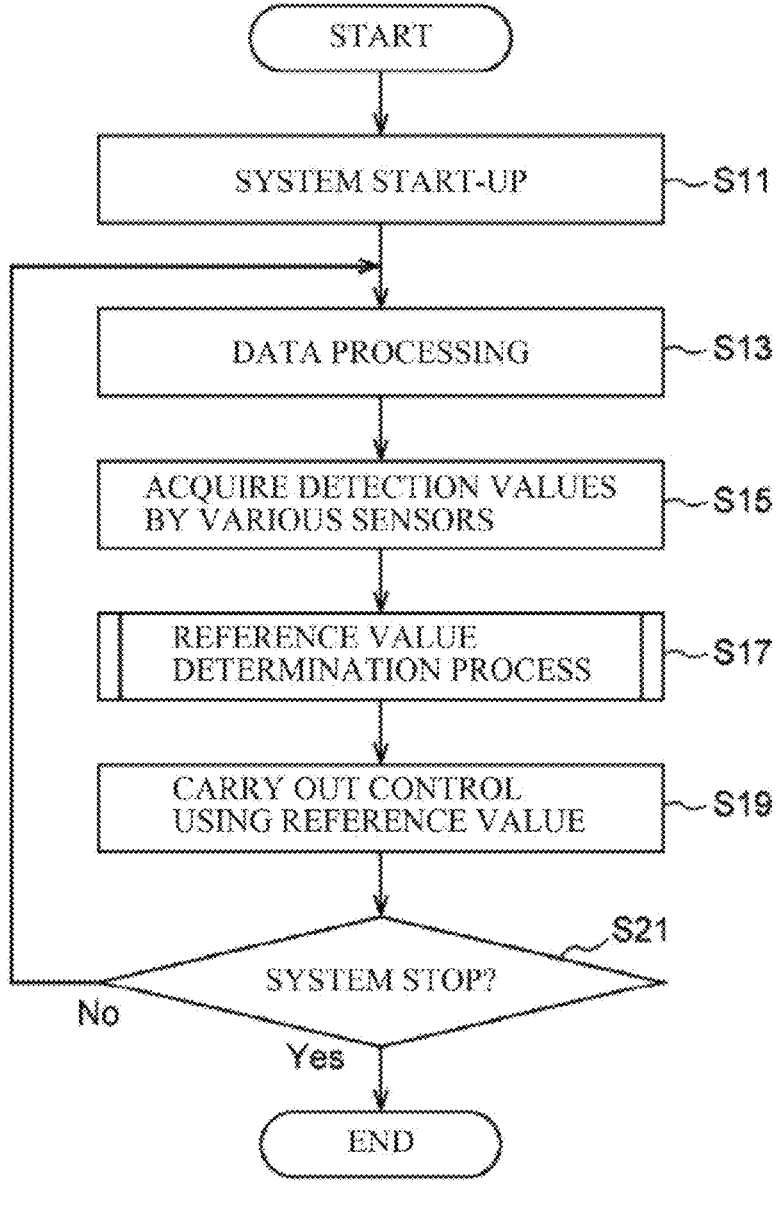
FIG. 11 is a flowchart of an example of processing operation by the control device in the embodiment.

FIG. 11 is a flowchart of a main routine of processing operation by the control device 50. It is to be noted that the processing in the flowchart in FIG. 11 may be constantly carried out while a system of the vehicle 1 is in operation, or may be carried out while, for example, a switch provided for a start-up of the control according to the technology of the disclosure is turned on.

When a signal indicating an abnormality is received from some of the sensors, the processing operation of the technology of the disclosure may be applied to other controls than the controls using the detection values by the relevant sensors. That is, the technology of the disclosure is particularly effective when accuracy of any one of the sensors having the same detection target declines, but it is not possible to identify which sensor has declined in accuracy.

At a start-up of the system of the vehicle 1 including the control device 50 (step S11), the first data processor 61, the second data processor 63, and the third data processor 65 of the processor 51 may calculate the predetermined detection values based on the signals transmitted from the sensors (step S13).

In one example, the first data processor 61 may perform processing of detecting the surrounding environment of the vehicle 1 based on the image data transmitted from the stereo cameras 31R and 31L on the predetermined sampling cycles. In one example, the first data processor 61 may detect random vehicles, bicycles, buildings, persons, and other objects present around the vehicle 1 based on the image data transmitted from the stereo cameras 31R and 31L. Moreover, the first data processor 61 may estimate the positions of the random vehicles, etc., the distances from the vehicle 1 to the random vehicles, etc., and speeds of the random vehicles, etc. Furthermore, the first data processor 61 may detect the borderline of the roadway or the road based on the image data, and calculate the distance from the vehicle 1 to the borderline.

The second data processor 63 may perform processing of detecting the surrounding environment of the vehicle 1 based on the distribution data regarding the points of reflection transmitted from the LiDAR 33 on the predetermined sampling cycles. In one example, the second data processor 63 may detect an object present around the vehicle 1 based on the distribution data transmitted from the LiDAR 33. Moreover, the second data processor 63 may calculate a position of the object detected based on the time-series distribution data, a distance from the vehicle 1 to the object, and a relative speed of the object with respect to the vehicle

1. Furthermore, the second data processor 63 may detect the borderline of the road or the roadway based on the distribution data, and calculate the distance from the vehicle 1 to the borderline.

The third data processor 65 may perform processing of detecting the speed of the vehicle 1 based on the position data regarding the vehicle 1 transmitted from the vehicle position sensor 35 on the predetermined sampling cycles. In one example, the third data processor 65 may calculate the distance of movement for each predetermined sampling cycle based on the latitude and the longitude transmitted from the vehicle position sensor 35, and estimate the speed of the vehicle 1 by dividing the distance of movement by the time of the cycle.

It is to be noted that the processor 51 may carry out a process of calculating other detection values than described above, based on signals of the various sensors provided in the vehicle 1. In addition, calculation of any of the detection values described above may be omitted when the relevant detection value is unnecessary for the control to be carried out by the processor 51.

Thereafter, the obtainer 67 of the processor 51 may carry out the acquisition process of acquiring the detection values of the detection target by the various sensors provided in vehicle 1 (step S15). In one example, the obtainer 67 may acquire the inter-vehicle distance to the preceding vehicle and the distance from the vehicle 1 to the borderline of the roadway or the road detected by the first data processor 61 based on the image data by the stereo cameras 31R and 31L. Moreover, the obtainer 67 may acquire the inter-vehicle distance to the preceding vehicle and the distance from the vehicle 1 to the borderline of the roadway or the road detected by the second data processor 63 based on the distribution data by the LiDAR 33. Furthermore, the obtainer 67 may acquire the speed of the vehicle 1 detected by the third data processor 65 based on the position data regarding the vehicle 1 by the vehicle position sensor 35. In addition, the obtainer 67 may acquire the speed of the vehicle 1 detected based on the signal by the wheel speed sensor 37.

Thereafter, the reference value determiner 69 of the processor 51 may carry out the process of determining the reference value by the determination method set in accordance with the control (step S17).

Figure 12:
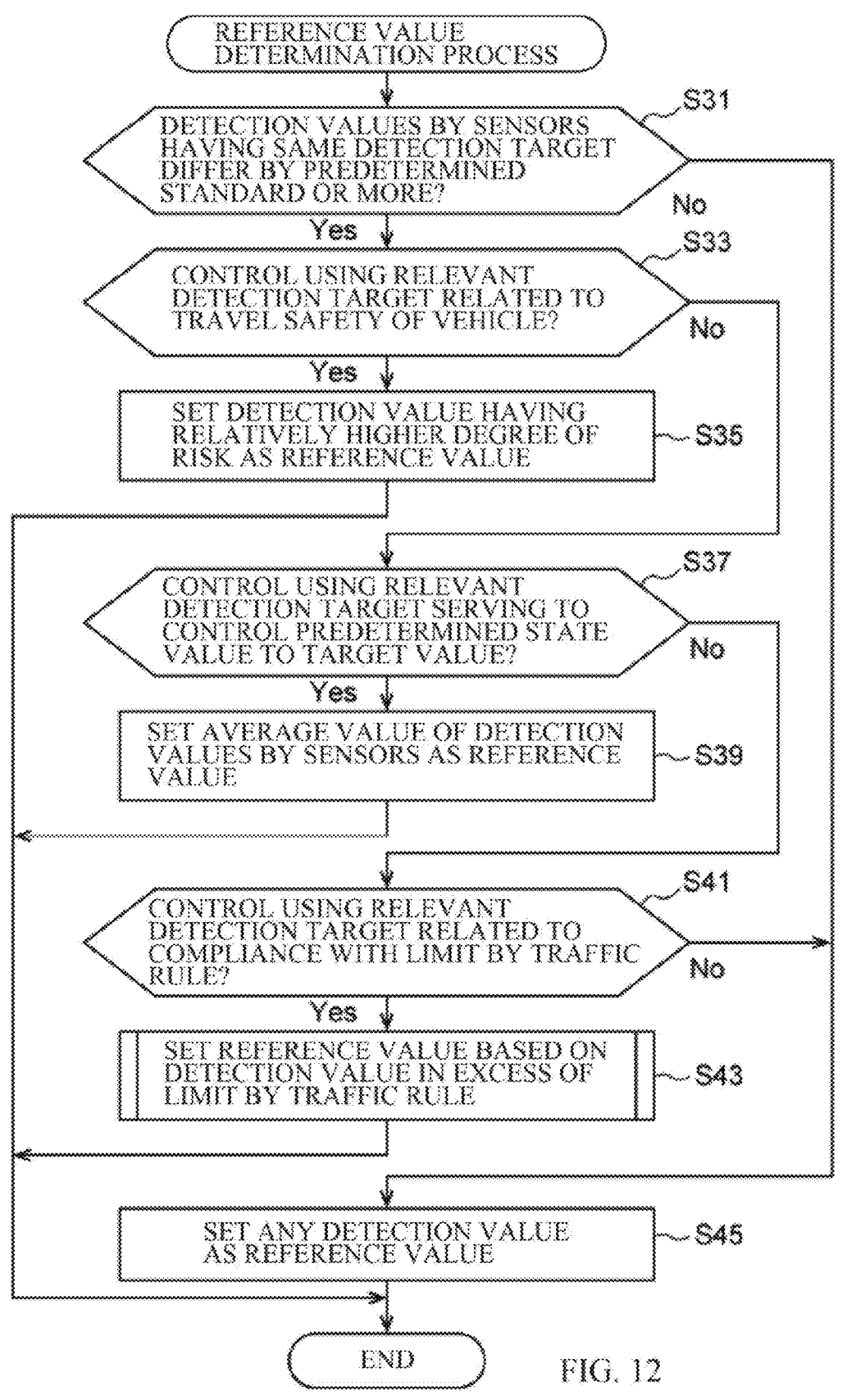
FIG. 12 is a flowchart of a reference value determination process in the embodiment.

FIG. 12 is a flowchart of the reference value determination processing.

The reference value determiner 69 may determine whether or not the detection values by the sensors having the same detection target differ by the predetermined standard threshold value or more (step S31). For example, the reference value determiner 69 may determine whether or not the distance detected by the LiDAR 33 and the distance detected by the stereo cameras 31R and 31L differ by the predetermined standard threshold value or more. The predetermined standard threshold value may be set in advance, in consideration of the accuracy error of the detection value by the LiDAR 33 and the accuracy error of the detection value by the stereo cameras 31R and 31L, to make it possible to determine a difference equal to or greater than the extent that the accuracy errors do not overlap each other. In addition, the reference value determiner 69 may determine, for example, whether the vehicle speed detected by the vehicle position sensor 35 and the vehicle speed detected by the wheel speed sensor 37 differ by the predetermined standard threshold value or more.

When the reference value determiner 69 does not determine that the detection values by the sensors having the same detection target differ by the predetermined standard threshold value or more (S31/No), the reference value determiner 69 may set any detection value by any one of the sensors, as the reference value of each control (step S45). In this case, as the reference value, it may be determined in advance which sensor's detection value is to be used for each control. Alternatively, whichever detection value has the smallest difference from the reference value used in the previous calculation cycle may be used as the reference value. There is no particular limitation on the method of setting the reference value.

When the reference value determiner 69 determines that the detection values by the sensors having the same detection target differ by the predetermined standard threshold value or more (S31/Yes), the reference value determiner 69 may determine whether or not the control using the relevant detection target by the sensors is related to the travel safety of the vehicle 1 (step S33). For example, the reference value determiner 69 may determine whether or not the relevant control is the emergency brake control. When the reference value determiner 69 determines that the control is related to the travel safety of the vehicle 1 (S33/Yes), the reference value determiner 69 may set, as the reference value to be used for the control, whichever detection value has the relatively higher degree of risk, out of the detection values by the sensors (step S35). For example, the reference value determiner 69 may adopt whichever distance is shorter that shorten the collision margin time, as the reference value of the distance to the preceding vehicle or the obstacle to be used for the emergency brake control. The reference value determiner 69 may adopt whichever speed is higher that shorten the collision margin time, as the reference value of the speed of the vehicle 1 to be used for the emergency brake control.

When the reference value determiner 69 does not determine that the control is related to the travel safety of the vehicle 1 (S33/No), the reference value determiner 69 may determine whether or not the control using the relevant detection target by the sensors serves to control the predetermined state value to the target value (step S37). For example, the reference value determiner 69 may determine whether or not the control is the adaptive cruise control, the constant speed control, or the travel position keeping. When the reference value determiner 69 determines that the control serves to control the predetermined state value to the target value (S37/Yes), the reference value determiner 69 may set the average value of the detection values by the sensors as the reference value to be used for the control (step S39). For example, the reference value determiner 69 may set the average value of the detection values, as the reference value of the inter-vehicle distance to be used for the adaptive cruise control, the reference value of the vehicle speed to be used for the constant speed control, or the reference value of the distance from the borderline of the roadway or the road to be used for the travel position keeping.

When the reference value determiner 69 does not determine that the control serves to control the predetermined state value to the target value (S37/No), the reference value determiner 69 may determine whether or not the control using the relevant detection target by the sensors is related to the compliance with the limit by the traffic rule (step S41). For example, the reference value determiner 69 may determine whether or not the control is the speed limit keeping. When the reference value determiner 69 determines that the control is related to the compliance with the limit by the traffic rule (S41/Yes), the reference value determiner 69 may set the reference value based on the detection value in excess of the limit by the traffic rule (step S43).

Figure 13:
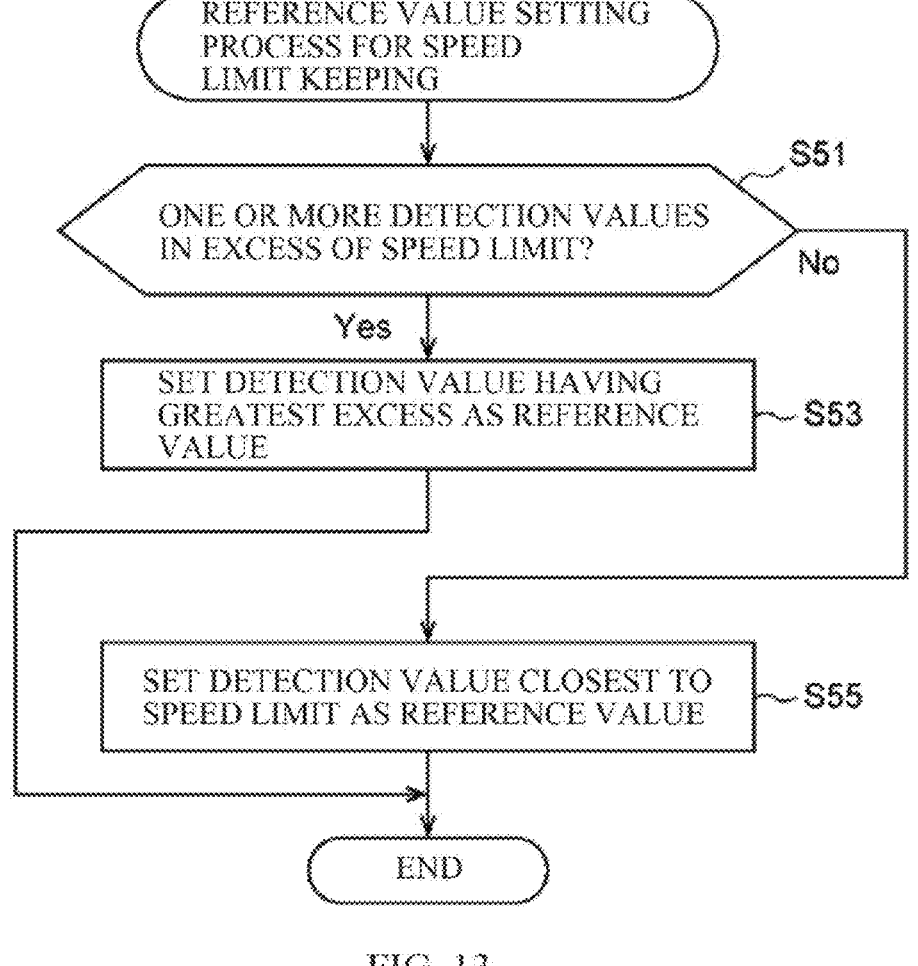
FIG. 13 is a flowchart of a reference value setting process for speed limit keeping in the embodiment.

FIG. 13 is a flowchart of the process of setting the reference value for the speed limit keeping.

The reference value determiner 69 may determine whether or not one or both of the detection value of the vehicle speed detected by the vehicle position sensor 35 and the detection value of the vehicle speed detected by the wheel speed sensor 37 are in excess of the speed limit (step S51). When the reference value determiner 69 determines that one or both of the detection values of the vehicle speed by the sensors are in excess of the speed limit (S51/Yes), the reference value determiner 69 may set whichever detection value has the greatest excess, as the reference value to be used for the speed limit keeping (step S53). When the reference value determiner 69 does not determine that one or both of the detection values of the vehicle speed by the sensors are in excess of the speed limit (S51/No), the reference value determiner 69 may set whichever detection value is closest to the speed limit, as the reference value to be used for the speed limit keeping (step S55).

Back to FIG. 12, in step S41, when the reference value determiner 69 does not determine that the control is related to the compliance with the limit by the traffic rule (S41/No), the reference value determiner 69 may set any of the detection values as the reference value (step S45). In step S41, when determining in negation, the reference value determiner 69 may set the reference value by the determination method set in advance in accordance with the control using the detection target by the sensors.

Back to FIG. 11, after the reference values to be used in the respective controls are determined in step S17, the controller 71 may carry out the controls using the respective reference values thus set (step S19). In this embodiment, the controller 71 may carry out the emergency brake control, the adaptive cruise control, and the constant speed control. The emergency brake control includes using the reference values of the distance to the obstacle or the random vehicle and the speed of the vehicle 1. The adaptive cruise control includes using the reference values of the inter-vehicle distance to the preceding vehicle and the speed of the vehicle 1. The constant speed control includes using the reference value of the speed of the vehicle 1. Moreover, the controller 71 may carry out the travel position keeping and the speed limit keeping. The travel position keeping includes using the reference value of the distance to the borderline of the roadway or the road, or the curbstone. The speed limit keeping includes keeping the speed of the vehicle 1 to or below the speed limit. In addition, the controller 71 may carry out any control using the detection values by the sensors.

Thereafter, the controller 71 may determine whether or not the system of the vehicle 1 including the control device 50 has stopped (step S21). When the controller 71 does not determine that the system has stopped (S21/No), the controller 71 may cause the flow to return to step S13 and repeat the processes of the steps described above. When the controller 71 determines that the system has stopped (S21/Yes), the controller 71 may end the processing operation.

As described, in this embodiment, when the detection values by the sensors that detect the same detection target differ by the predetermined standard threshold value or more, the control device 50 determines the reference value to be used for the control, by the determination method set in accordance with the control using the relevant detection target. Thus, when it is unknown which sensor out of the sensors has declined in accuracy, it is possible to set the appropriate reference value in accordance with the control. Hence, it is possible to carry out each of the controls safely or without giving the sense of discomfort or the sense of anxiety to the occupant.

Moreover, on the condition that the control is related to travel safety of the vehicle 1, e.g., the emergency brake control, the control device 50 may determine, as the reference value, whichever of the detection values by the sensors has the relatively higher degree of risk. Thus, depending on the control, the travel state is controlled more safety-wise. Hence, it is possible to prevent the decline in the safety even when the accuracy of any of the sensors has declined.

Furthermore, on the condition that the control serves to control the predetermined state value to the target value, e.g., the adaptive cruise control, the constant speed control, or the travel position keeping, the control device 50 may determine, as the reference value, the average value of the detection values by the sensors. Thus, when the accuracy of any of the sensors has declined, it is possible to prevent the deviation between the actual state value and the state value to be controlled to the target value from becoming remarkably large. It is possible to alleviate the sense of discomfort or the sense of anxiety of the occupant.

In addition, on the condition that the control is related to the compliance with the limit by the traffic rule, the control device 50 may determine, as the reference value, when one or more detection values out of the detection values by the sensors are in excess of the limit by the traffic rule, whichever detection value has greatest excess out of the one or more detection values in excess of the limit by the traffic rule. The control device 50 may determine, as the reference value, when the detection values by the sensors are devoid of excess of the limit by the traffic rule, whichever detection value is closest to the limit by the traffic rule out of the detection values by the sensors. The control device 50 carries out the control without excess of the limit by the traffic rule. Thus, even when the accuracy of any of the sensors has declined, it is possible to bring the control target close to the limit within the limit by the traffic rule, leading to prevention of decline in safety. It is also possible to alleviate the sense of discomfort or the sense of anxiety of the occupant.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the forgoing example embodiments, an example is described in which the reference value is determined by the predetermined reference value determination method when the detection values by the different sensors that detect the same detection target differ by the predetermined threshold value or more. However, the disclosure is not limited to such an example. When the vehicle 1 includes the same kind of sensors that detect the same detection target, the technology of the disclosure may be applied by comparing the detection values by the same kind of sensors with one another. Thus, when the vehicle 1 includes the same kind of sensors, it is possible to provide redundancy of the control using the detection values by the relevant sensors.

Moreover, in the forgoing example embodiments, description is made by giving an example of the control using, as the detection targets, the distance to the obstacle or the random vehicle, and the vehicle speed. However, the technology of the disclosure is not limited to such an example. For example, when detection values by a rotation angle sensor of a motor and an angular velocity sensor of the vehicle of which the detection targets are the steering angle of the electric steering device differ by a predetermined standard threshold value or more, the reference value may be determined by the determination method in accordance with the control. Furthermore, when detection values by a rotation torque sensor and an acceleration rate sensor of which the detection targets are output torque of a driving motor differ by a predetermined standard threshold value or more, the reference value may be determined by the determination method in accordance with the control. In addition, when detection values by the vehicle position sensor and the angular velocity sensor of which the detection targets are a yaw rate of a vehicle body differ by a predetermined standard threshold value or more, the reference value may be determined by the determination method in accordance with the control.

In any of the forgoing examples of the detection targets, using the appropriate reference value in accordance with the control target makes it possible to suppress the decline in the travel safety of the vehicle 1, even when the accuracy of any of the sensors has declined. Moreover, it is possible to alleviate the sense of discomfort or the sense of anxiety of the occupant.

As used herein, the term "collision" may be used interchangeably with the term "contact".

The processor 51 of the control device 50 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 51 of the control device 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 51 of the control device 50 illustrated in FIG. 2.

The invention claimed is:

1. A control device to be applied to a vehicle, the control device being configured to control the vehicle based on detection values by sensors, the control device comprising:

one or more processors; and one or more memories communicably coupled to the one or more processors, the one or more processors being configured to:

acquire the detection values by the respective sensors, the sensors being configured to detect a same detection target, the same detection target comprising a distance to a target, a speed of the vehicle, or both;

determine whether or not the detection values by the sensors differ by a predetermined threshold value or more;

determine a reference value by applying a determination method set in accordance with a control using data regarding the detection target to the detection values by the sensors, when the detection values by the sensors differ by the predetermined threshold value or more; and control at least one of a brake system, an electric steering device, or a driving force source, based on the reference value, wherein when the control is related to compliance with a limit by a traffic rule, the one or more processors are configured to:

determine, as the reference value, when one or more detection values out of the detection values by the sensors are in excess of the limit by the traffic rule, whichever detection value has greatest excess out of the one or more detection values in excess of the limit by the traffic rule;

determine, as the reference value, when the detection values by the sensors are devoid of excess of the limit by the traffic rule, whichever detection value is closest to the limit by the traffic rule out of the detection values by the sensors; and carry out the control without excess of the limit by the traffic rule.

2. The control device to be applied to the vehicle according to claim 1, wherein when the control serves to maintain the speed of the vehicle to a speed limit or a legal speed of a road on which the vehicle is traveling, the one or more processors are configured to:

determine, as the reference value, when one or more detection values out of the detection values by the sensors are in excess of the speed limit or the legal speed, whichever detection value has greatest excess out of the one or more detection values in excess of the speed limit or the legal speed; and determine, as the reference value, when the detection values by the sensors are devoid of excess of the speed limit or the legal speed, whichever detection value is closest to the speed limit or the legal speed out of the detection values by the sensors.

3. A non-transitory computer-readable recording medium containing a program, the program causing, when executed by one or more processors, the one or more processors to implement a method comprising:

acquiring detection values by respective sensors, the sensors being configured to detect a same detection target, the same detection target comprising a distance to a target, a speed of a vehicle, or both;

determining whether or not the detection values by the sensors differ by a predetermined threshold value or more;

determining a reference value by applying a determination method set in accordance with a control of the vehicle using data regarding the detection target to the detection values by the sensors, when the detection values by the sensors differ by the predetermined threshold value or more; and control at least one of a brake system, an electric steering device, or a driving force source, based on the reference value, wherein when the control is related to compliance with a limit by a traffic rule, the one or more processors are configured to:

determine, as the reference value, when one or more detection values out of the detection values by the sensors are in excess of the limit by the traffic rule, whichever detection value has greatest excess out of the one or more detection values in excess of the limit by the traffic rule;

determine, as the reference value, when the detection values by the sensors are devoid of excess of the limit by the traffic rule, whichever detection value is closest to the limit by the traffic rule out of the detection values by the sensors; and carry out the control without excess of the limit by the traffic rule.

* * * * *